March 16, 1937.  J. G. BLUNT  2,074,299
RAILWAY VEHICLE STRUCTURE
Filed Nov. 20, 1935  4 Sheets-Sheet 1
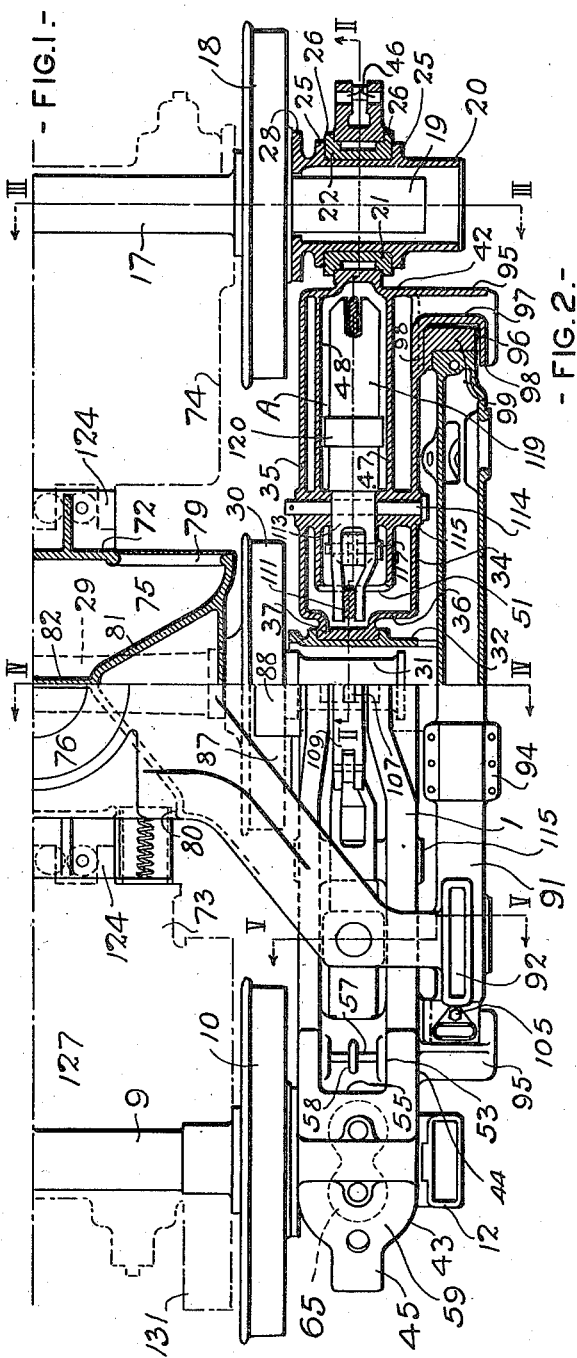
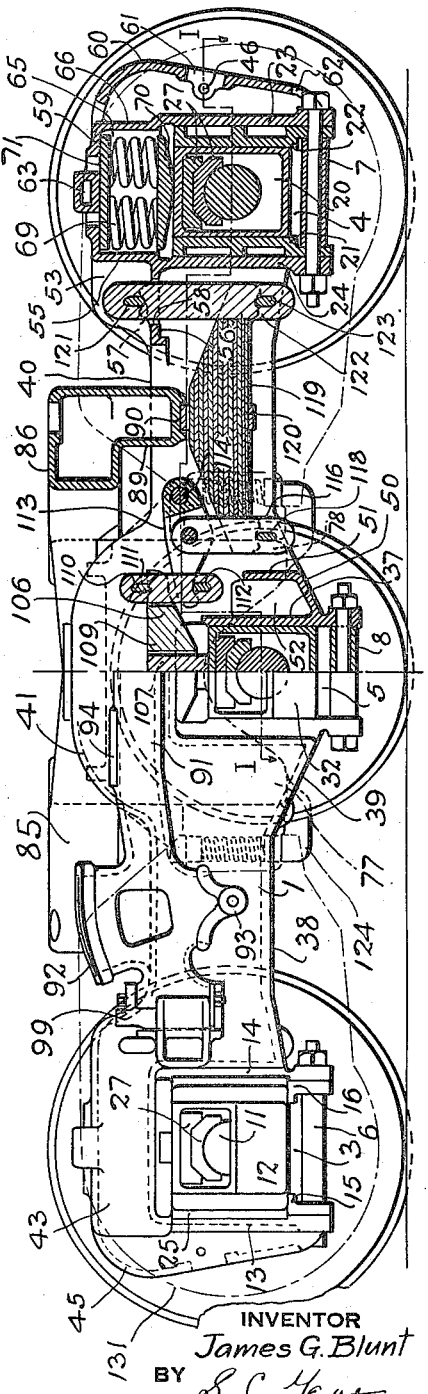
INVENTOR
James G. Blunt
BY
S. C. Yeaton
ATTORNEY March 16, 1937.  J. G. BLUNT  2,074,299
RAILWAY VEHICLE STRUCTURE
Filed Nov. 20, 1935  4 Sheets-Sheet 2
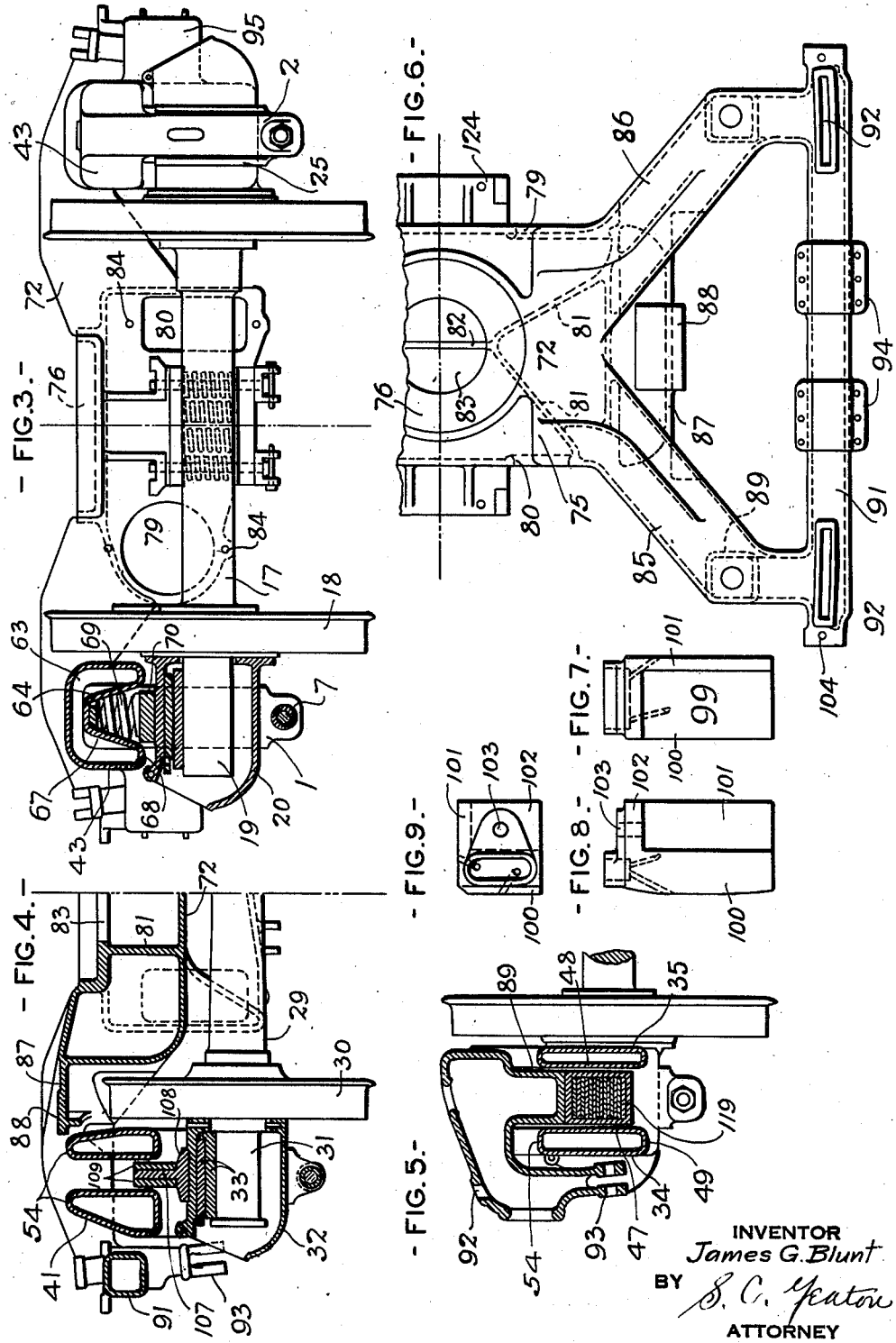
INVENTOR
James G. Blunt
BY S. C. Yeaton
ATTORNEY March 16, 1937.  J. G. BLUNT  2,074,299
RAILWAY VEHICLE STRUCTURE
Filed Nov. 20, 1935   4 Sheets-Sheet 3
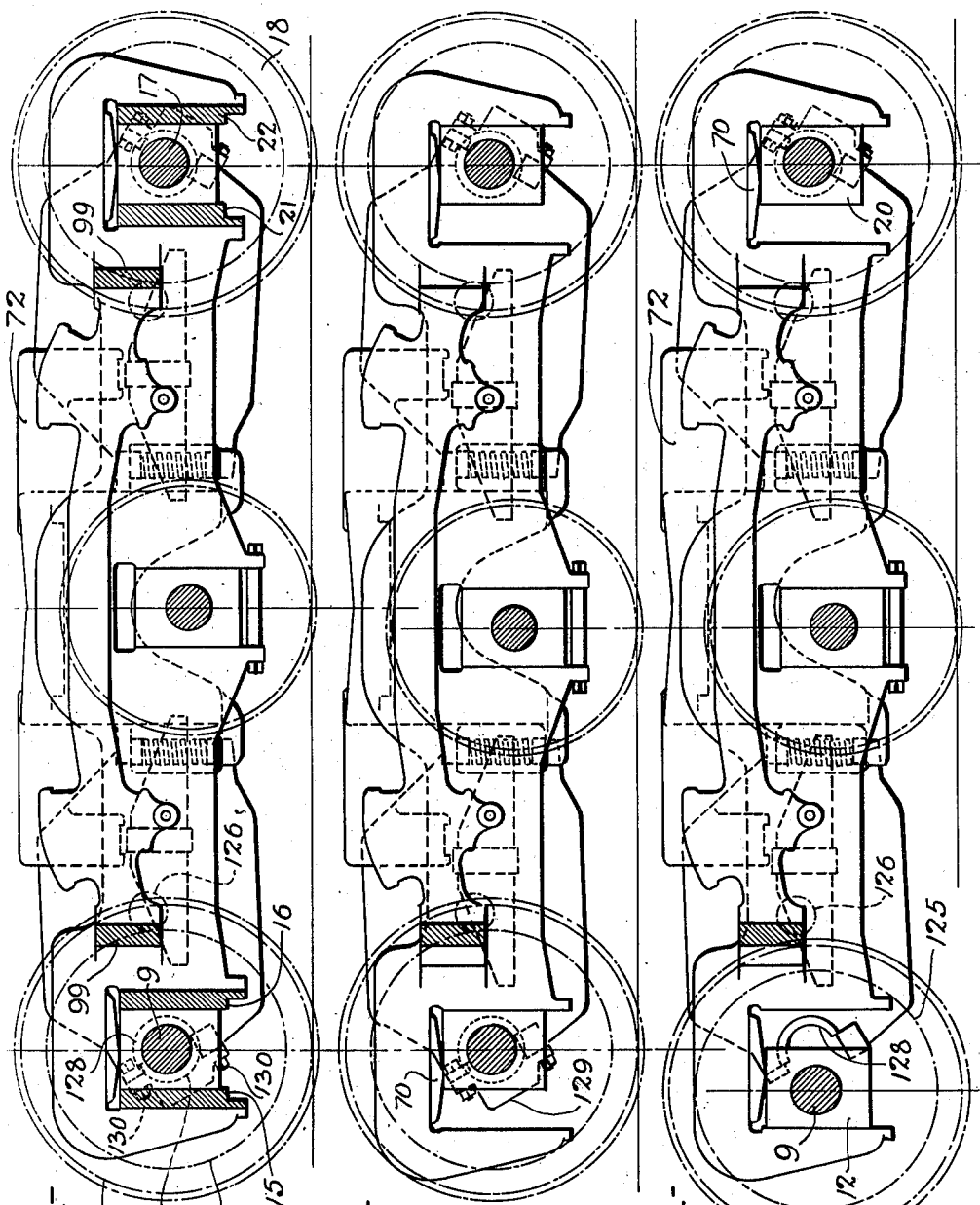
INVENTOR
James G. Blunt
BY
ATTORNEY March 16, 1937.　　　J. G. BLUNT　　　2,074,299
RAILWAY VEHICLE STRUCTURE
Filed Nov. 20, 1935　　　4 Sheets-Sheet 4
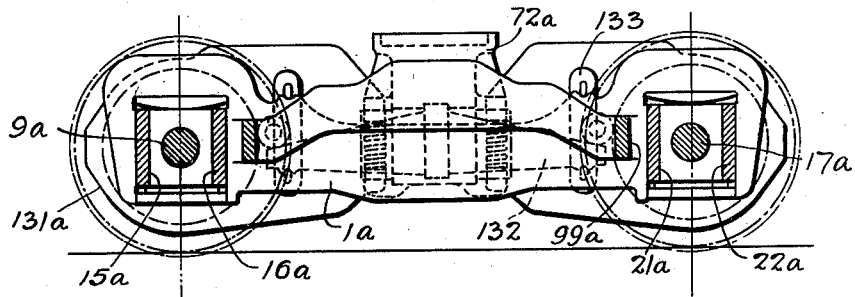
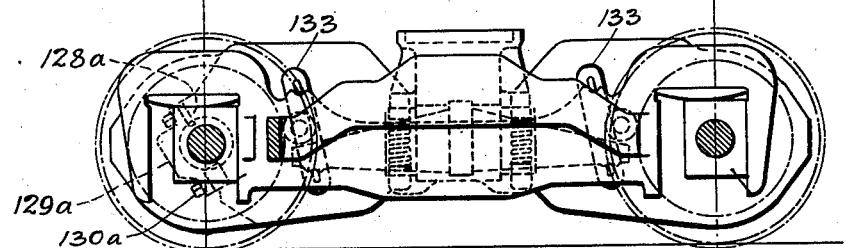
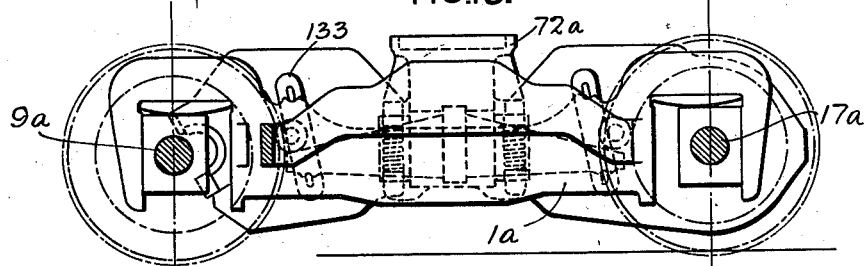
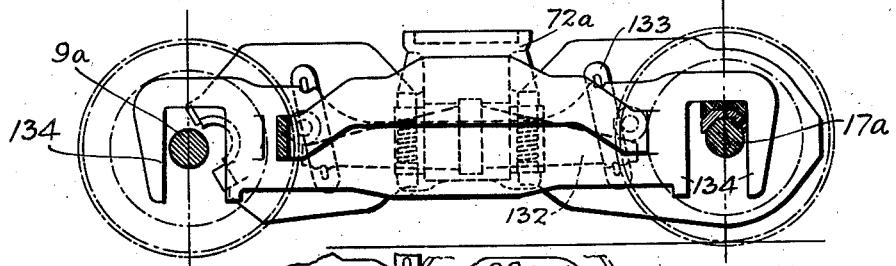
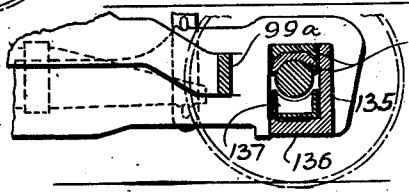
INVENTOR
James G. Blunt
BY
S. C. Yeaton
ATTORNEY Patented Mar. 16, 1937

2,074,299

UNITED STATES PATENT OFFICE 2,074,299

RAILWAY VEHICLE STRUCTURE

James G. Blunt, Schenectady, N. Y., assignor to American Locomotive Company, New York, N. Y., a corporation of New York Application November 20, 1935, Serial No. 50,625

18 Claims. (Cl. 105—196)

This invention relates to railway vehicle structures, and more particularly to railway vehicle trucks.

An object of the invention is to devise a railway vehicle truck of the power-driven type wherein are provided frame side members and a bolster adapted for relative movement in a direction longitudinally of the truck for facilitating the removal of a driven axle when occasion arises.

A further object of the invention is to provide a railway vehicle truck having frame side members and a bolster of novel characteristics to better adapt the truck for its intended use.

A further object of the invention is to provide, in a railway vehicle truck having frame side members and a bolster, a spring rigging of novel characteristics flexibly connecting the bolster with the side members to better adapt the truck for its intended use.

Other and further objects of and advantages achieved by this invention will be apparent from the following description of approved embodiments thereof and the claims appended thereto.

The invention is illustrated in the accompanying drawings, wherein Figure 1, at the left, is a plan view of an end quarter of a six-wheel electric motor vehicle truck of the removable journal box type embodying the present invention, illustrating the means facilitating the removal of the motor driven axles and novel characteristics of the frame side members and bolster and spring rigging for flexibly supporting the bolster upon the side members, and at the right, a horizontal opposite end quarter sectional view through the broken line I—I of Fig. 2, parts being indicated by dot and dash lines; Fig. 2, at the left, is a side elevation of the portion of the truck shown at the left in Fig. 1, and at the right, a vertical section through the line II—II of Fig. 1, parts being indicated by dot and dash lines; Fig. 3 is an end view of the truck, viewed from the right of Fig. 1, the journal box at the left and certain associated parts being shown in vertical section through the line III—III of Fig. 1; Fig. 4 is a vertical section through the line IV—IV of Fig. 1, certain parts being shown in elevation; Fig. 5 is a vertical section through the line V—V of Fig. 1, certain parts beyond the section being shown fragmentally and in elevation; Fig. 6 is a fragmental plan view of the bolster; Figs. 7 to 9 are enlarged views of the filler or shoe located at the left in Fig. 1, between the bolster and frame side member, Fig. 7 being an end elevation, Fig. 8 a front elevation, and Fig. 9 a plan view; Figs. 10, 11 and 12 are diagrammatic side elevations, certain parts being shown in section and other parts in dot and dash lines for clarity, showing the relative positions certain of the parts will assume preparatory to removing a driven wheeled axle; Figs. 13, 14 and 15 are diagrammatic side elevations of a four-wheel truck of the removable journal box type, shown somewhat similarly to Figs. 10, 11 and 12, showing the relative positions certain of the parts will assume preparatory to removing a driven wheeled axle; and Figs. 16 and 17 are diagrammatic side elevations (Fig. 16 being a fragmental view) of a four-wheel truck of the rigid box type, showing the relative positions certain of the parts will assume preparatory to removing a driven wheeled axle.

Only sufficient of the parts of the trucks of the several views are shown for a clear understanding of the present invention.

Referring more particularly to Figs. 1 to 12, the railway vehicle structure, comprising the present invention in various of its aspects is here illustrated as a six-wheel removable journal box railway vehicle motor truck of the outside journal bearing type. This truck comprises frame side members 1 and 2 provided with aligned pedestal openings 3 at corresponding end portions thereof, similar aligned pedestal openings 4 at the opposite end portions thereof, and aligned pedestal openings 5 at the central portions thereof. The openings are provided at their extended lower ends with removable closures 6, 7 and 8 respectively, comprising tie bolts and embracing spreader thimbles in the usual manner.

A driven wheeled axle 9, having wheels 10 secured thereon inside the frame side members and end journals 11 beyond the wheels, is extended at the journal ends into the pedestal openings 3, more particularly into removable journal boxes 12 housed in these pedestal openings, for vertical sliding relation therewith.

The truck is similar on each side of its longitudinal center. Therefore as to details of construction one side only will be described more particularly. Accordingly hereafter the side shown in Fig. 1 will be more particularly described, it being understood that similar parts similarly arranged appertain to the opposite side.

The sides of the opening 3 of the frame side member 1 are defined by an outer pedestal 13 and an inner pedestal 14, forming part of the frame side member. A space is provided between the box and the pedestal 13 which is filled by a filler or shoe 15, and a space is provided between the box and the pedestal 14 which is filled by a filler or shoe 16, the extended lower ends of the shoes being orificed to receive the bolt of the closure 6.

A wheeled axle similar to that already described, is disposed at the opposite end of the truck and comprises a driven wheeled axle 17, wheels 18 and journals 19.

In the opening 4 of the frame side member 1 are provided a journal box 20 and fillers or shoes 21—22, the sides of the opening 4 being defined by an outer pedestal 23 and an inner pedestal 24, all similar to the corresponding parts previously described.

Each of the shoes is engaged by a front and a rear vertical flange 25 formed on the respective boxes to permit vertical sliding of the boxes relative to their respective shoes, and each of the shoes is provided with a front and a rear flange 26 to hold the shoe against lateral movement, the shoes cooperating with their adjacent box flanges 25 to hold the respective boxes against lateral movement. The shoes are removable by downward vertical movement after their holding bolts have been removed and are of a suitable thickness for a purpose later to be described.

Between the top wall of each of the boxes 12 and 20 and its journal associated with the frame side member 1 is the usual bearing means, indicated at 27, for supporting each box upon its journal. Each box is provided at the rear end with a flange 28, preferably of relatively large diameter, in working engagement with the outer face of the hub of the adjacent wheel, providing thereby a thrust bearing for taking the end thrusts of the opposite wheel, the flange being preferably of too large a size to permit the box to be removed from the truck by movement transversely of the truck through the pedestal opening with which it is associated when the fillers or shoes thereof have been removed.

A non-driven third wheeled axle 29, having wheels 30 secured thereon inside the frame side members and end journals 31 beyond the wheels, is extended at the journal ends into the pedestal openings 5, more particularly into the removable journal boxes 32 housed in these pedestal openings for vertical sliding relation therewith. Between the top wall of each box 32 and its journal associated with the frame side member 1, is the usual bearing means, indicated at 33, for supporting the box upon its journal.

The frame side members 1 and 2 are independent of each other except through their connection with the bolster, as will later be described, and are similar in all respects, particular detailed reference therefore being made for brevity to the side member 1. The side member 1 is cast as an integral structure. The side member, generally speaking, is of hollow formation. It comprises an outer wall 34 and an inner wall 35. These walls in the main are vertical and at their longitudinal lower central portions are interrupted by the pedestal opening 5, and the space between the walls at each side of the pedestal opening is closed by the transverse walls 36, the walls 36, at an intermediate portion thereof, being extended somewhat inwardly to provide the pedestals 37 for the box 32, the pedestals being extended downward to provide orificed lugs for receiving the removable closure 8.

The outer and inner walls 34—35 have substantially horizontal lower edge portions 38, spaced from the central pedestal opening 5, which are connected to the bottom thereof by downward inclined portions 39. Corresponding substantially horizontal portions 40 oppositely disposed to the portions 38 are provided at the top edges of the walls 34—35, and are connected at their inner ends by curved or arched portions 41 which extend a substantial distance above the top of the opening 5 thereby providing added depth to the walls 34—35 between the top edges of the portions 41 and the lower edges of the portions 39 to provide for the required strength about the pedestal opening 5. The outer and inner walls 34—35 continue longitudinally outward until they meet transverse walls 42 which connect the outer and inner walls 34—35, the horizontal lower edge portions 38 being inclined slightly downward where they meet the adjacent transverse wall 42 at substantially the bottom of the respective pedestal openings 3 and 4, each of the walls 42 at an intermediate portion thereof being extended somewhat away from each other to provide the pedestals 14 and 24, the pedestals being extended downward to provide orificed lugs for receiving the respective removable closures 6 and 7.

The outer and inner walls 34—35 have, at their ends, upward extending portions 43 disposed above the pedestal openings 3 and 4 respectively. The wall portions 43 extend longitudinally inward from the transverse walls 42 to provide strengthening webs 44. At the ends of the side member 1 are laterally spaced vertical outer and inner walls 45. The wall portions 43 at their outer end portions are rounded transversely inward. Each of the rounded portions at its vertical edge meets or merges with the inner edge of the upper portion of its adjacent wall 45. The walls 45 extend longitudinally outward from said rounded portions respectively and from the pedestal 13 or 23 which is adjacent thereto, and extend vertically from the tops of the respective portions 43 to the bottom of the adjacent pedestal 13 or 23 as the case may be, or more exactly to lugs depending from the pedestals 13 and 23, these lugs being orificed similar to the lugs of the pedestals 14 and 24 for the reception of the closures 6 and 7 respectively. The outer edges of the walls 45 are inwardly curved at their upper portions to meet the portions 43 respectively. The rounded portions of the wall portions 43 at their lower edges are formed to extend transversely inward until they meet and merge with their respective adjacent walls 45. The walls 45 are provided with orifices 46 for the securing therein of safety chains (not shown) in the usual manner.

The outer and inner walls 34—35 at their base portions beneath the arched portions 41 extend vertically upward from their bottom edges to a short distance above the pedestal opening 5. They then converge upwardly toward each other to the top edges of the arched portions 41. Each of these converging portions furthermore converge longitudinally inward toward each other, and at the center portion extend substantially parallel to each other for a distance of approximately the width of the pedestal opening 5, as best shown in Figs. 1 and 4.

Spaced walls 47—48 are disposed within the space between the outer and inner walls 34—35 in spaced substantially parallel relation therewith. These walls 47—48 extend longitudinally of the vehicle and are connected at their outer ends to the adjacent wall 42. The bottom edges of the walls 47—48 are in horizontal alignment with the bottom edges of the walls 34—35 respectively, and are connected therewith by bottom closing walls 49. These bottom closing walls at each side of the pedestal opening 5 also, for a short distance, extend between the walls 47—48, as shown at 50, the portion between the walls 47—48 being continued upward between the walls 47—48 for a short distance, as shown at 51, to provide additional reinforcement, the walls 47—48 being cut away between the walls 36, and wall portions indicated at 50 and 51 to provide openings 52 for convenience in casting. Above these openings the walls 47—48 connect with the upper portions of the walls 36. Except for the wall portion indicated at 50 between the walls 47—48 the space between these walls 47—48 is open throughout at the bottom. The top edges of the walls 47—48 are in horizontal alignment with the top edges of the walls 34—35, the walls 47—48 being provided with vertical strengthening webs 53 similar to the strengthening webs 44. The top edges of the walls 47—48 are respectively connected with their adjacent walls 34—35 by the top closing walls 54. These top closing walls at their end portions extend upward and longitudinally outward, inclosing the space between the webs 53 and their respective adjacent webs 44, to points where the walls 47—48 terminate, at which points the walls 47—48 at each end are connected by a transverse wall 55 which extends for the height of the webs and in substantially vertical alignment with the respective pedestals 14 and 24. The walls 47—48 are also connected by relatively short horizontal walls 56, each of which being connected to the wall 55 adjacent thereto and forming a spring hanger supporting wall for which purpose it is provided with a bearing 57 and a slot 58, later to be further referred to. Except for these supporting walls 56 the space between the walls 47—48 is open throughout at the top. Therefore except for the wall 56 and the wall portion indicated at 50 the space between the walls 47—48 is open throughout from top to bottom providing a housing A for purposes that will presently appear.

The top closing walls 54 are continued longitudinally outward beyond the walls 55 and extend therefrom the full width of the space between the walls 34—35 to the ends thereof, forming out a single wall 59 at each end. Each wall 59 is then contracted to inclose the space at the top between the walls 45 adjacent thereto and is extended downward to inclose the remainder of the space between the walls 45, providing thereby an end inclosing wall 60. These end inclosing walls 60 are provided with openings 61 to admit the safety chains before mentioned, and other openings 62 to admit the bolts of the closures 6 and 7. Across the top of the walls 59 and formed integral therewith centrally above the pedestal openings 3 and 4 respectively are reinforcing inverted channel-shaped walls 63.

Beneath each wall 59 and integral therewith is a wall 64 providing a housing for springs. The wall 64 has two spaced runs 65 integrally connected at their inner ends to the adjacent wall 55. These runs extend longitudinally outward in spaced relation with an adjacent wall portion 43 and are connected at their outer ends by a rounded vertical end portion indicated at 66, the extreme outer part of which being in substantial alignment with the adjacent pedestal 13 or 23 as the case may be. The runs, at substantially their central portions, are shaped to extend toward the center of the space between the runs, the extending thereof being gradually increased from the bottom upward, as shown at 67, thus forming two socket-like chambers above each of the pedestal openings 3 and 4. The bottom edges of the runs 65 are connected with the bottom edges of their adjacent wall portions 43 by walls 68 disposed above their respective pedestal openings 3 and 4, thereby providing spaces between the runs and their respective adjacent wall portions 43, open at their ends for communication with the spaces beyond each of the ends. The frame side member is thus further reinforced by the walls 64 and 68.

Within each of the sockets thus provided is a coil spring 69, a pair of springs being thus provided for each driven axle journal. Each pair of springs is supported on a rocker plate 70, which in turn is supported on the top of its adjacent journal box, and each pair is provided between the top ends of the springs thereof and the bottom of the wall 59 with a plate 71 which has the general contour of the wall 64 at the top edge thereof. The frame side members 1 and 2 are thus resiliently supported upon the driven axles 9 and 17, the shocks emanating from the wheels of these axles being thereby cushioned before reaching the frame side members.

The bolster of the truck, indicated generally by the reference numeral 72, is of the flexibly connected type, as will later appear, and serves as a cross member extending between the frame side members for supporting an end of the electric motor constructions, indicated at 73 and 74. The bolster is of hollow construction throughout and comprises a hollow body portion 75, the top wall of which being provided with a center plate 76 for connection with a center pin carried by the superstructure (not shown) for pivotally connecting the truck to the superstructure in the usual manner.

The central portion of the bottom wall of the body portion is of a somewhat inverted V-shape in longitudinal vertical section, thereby providing a relatively large transverse depression or recess through which passes the axle 29 thereby providing legs 77, 78, one on each side of the axle 29 and extending below the axle, the depression being of sufficient size to permit the desired vertical movement between the bolster and axle 29 and the desired relative movement between the axle 29, or more accurately the frame side members, and the bolster in a direction longitudinally of the vehicle to facilitate the removal of the driven axles 9 and 17, as will later appear.

The end walls of the body portion 75 are provided with diagonally opposed openings 79 and other diagonally opposed openings 80. The top and bottom walls of the body portion 75 are connected by side walls 81 somewhat V-shaped in horizontal section, the points of the V's being directed toward the center of the body portion and connected by a transverse wall 82, thereby providing two chambers, one each side of the wall 82. The top wall is provided with a circular opening 83 extending each side of the wall 82 for connection with an air supply system carried by the superstructure in the usual manner for supplying cooling air to the respective electric motors, according to the usual practice. In the present instance however each housing is provided with one of the openings 79 and 80 for connecting with the air cooling system of the motor (not shown), the openings 79 being circular to adapt them for a well-known type of air cooled electric motor, and the openings 80 are rectangular to adapt them for another well-known type of air cooled electric motor, thereby adapting the truck for use with either type of motor, it being understood that the openings 79 or 80 that will not be used will be closed by a cover plate, screw holes 84 being provided for attachment of the plates, or the cover plates may be secured by welding. The particular type of motor employed in the present instance is adapted for the opening 80, and accordingly the openings 79 will be closed, such closure being shown in Fig. 1, closing the opening 79 there shown.

An arm extends from each corner of the body portion 75 providing thereby two pairs of arms, a pair being in association with each of the side members 1 and 2, and as the bolster is similar on each side of its longitudinal center line only the arms 85, 86 associated with the side member 1 will be described in detail.

The arms 85 and 86 are hollow in construction and diverge from the body portion 75 to the frame side member 1, passing over the wheel 30, at which location they are shaped in cross section to escape the wheel at their lower inner portions. The arms 85—86 are connected by a hollow beam 87 over-riding the wheel 30 the beam being provided at its upper face with a bearing surface 88 for engagement with a side bearing carried on the superstructure or a side bearing device as the case may be (not shown). Each arm is formed with a hollow depending lug 89 which extends into the housing A in sliding relation both vertically and longitudinally with the walls 47—48. A transverse groove 90 is formed in the bottom wall of each lug for a purpose that will later appear. The arms 85—86 over-ride the frame side member 1 and are laterally extended beyond the lugs 89 and beyond the frame side member 1, and are integrally connected at their ends with a hollow beam 91. The beam 91, at each of its end portions is provided with a guide slot 92 and below it, at the bottom of the beam is a depending fulcrum support 93 for a brake lever (not shown) which extends through the guide slot. The beam 91 at its central portion is provided with flanges 94 for the securing thereto of a brake power cylinder (not shown). The frame side member 1 beyond the ends of the beam 91 is provided with integrally formed hollow lugs 95. Each of these lugs is formed angularly to provide a channel 96 into which the adjacent end of the beam 91 extends. Each channel is directed vertically with its vertical bottom wall 97 spaced from the adjacent end of the beam 91. Likewise the inner vertical side wall 98 of the channel is spaced somewhat from the inner wall of the adjacent end portion of the beam 91. These spaces are filled by a filler or shoe 99, one of which is shown in enlarged detail in Figs. 7 to 9.

The shoe 99 is angular in horizontal section, having a portion 100, and a portion 101 forming a shoulder with the portion 100, the shoulder thus formed being closed at the top by a portion 102. The shoe 99 shown in Figs. 7 to 9 illustrates the shoe at the left in Fig. 1. A similar shoe is disposed in the truck diagonally opposite. The other two shoes are similar but reversely constructed thereby providing rights and lefts of the four shoes employed. The portion 100 fills the space at the end of the beam 91 (left end Fig. 1) and the portion 101 fills the space between the inner vertical side wall of the channel and the inner wall of the adjacent end portion of the beam. The portion 102 over-rides the upper end portion of the beam 91 and is provided with a vertical orifice 103 in line with a vertical orifice 104 formed in the end portion of the beam 91, and a bolt 105 is secured in these orifices for removably securing the shoe to the end portion of the beam 91, for a purpose later to appear. A working clearance is provided between the walls of the channel 96 and the opposed walls of the shoe 99 in order that the bolster may have free vertical movement relative to the frame side member, and a lubricant cup is formed in the top of the shoe with lubricant passageways leading therefrom to faces of the shoe that are opposed to faces of the channel, for lubrication thereof, as clearly shown in Figs. 7 to 9.

The bolster is flexibly connected to the frame side members by a load distributing spring rigging associated with each frame side member, and as these riggings are similar in all respects, a detailed description of the spring rigging associated with the frame side member 1 will suffice.

The spring rigging, generally indicated by the reference numeral 106, is disposed in the housing A and comprises a post 107 having an extended base 108 which is seated in a depression formed on the top of the box 32. A longitudinally extending member, which is preferably but not necessarily non-flexible, and which is shown in the present instance as a rigid bar 109 seats upon the base 108 and is provided with a central orifice engaging the upstanding portion of the post 107. The bar 109 is bifurcated at its end portions and is provided at its upper face at each end portion with a transverse depression which supports a gib 110. A hanger 111 is provided at its upper end with an orifice which engages the central portion of the gib 110, the hanger extending downward between the furcations. The hanger is provided at its lower end with an orifice which engages the central portion of a gib 112.

A longitudinally extending lever 113 having a solid outer end and being bifurcated from said solid end to the opposite end is mounted on the gib 112 at said opposite end, the hanger 111 passing between the furcations at their inner end portions, the bottoms of these inner end portions being depressed to engage the gib 112. The outer solid end of the lever is provided with a transverse orifice which engages a pin 114 which extends through orificed bosses 115 formed integral one with the walls 34 and 47 and the other with the walls 35 and 48.

A hanger 116 is disposed at its upper end between the furcations of the lever 113, intermediate their ends and is secured thereto by a pin 117 engaged in aligned orifices in the hanger and lever. The lower portion of the hanger 116 is provided with an orifice which engages a gib 118 at its central portion. A longitudinally extending leaf spring 119 is bifurcated at its inner and outer end portions, the furcations being recessed on their bottom faces. The spring at its inner end portion is supported on the gib 118, the recesses at this end engaging the gib, the hanger 116 passing between the furcations. The center of the spring 119 is provided with the usual band 120 which is disposed at its upper portion in the transverse groove 90, the spring thereby supporting the bolster at this portion.

A gib 121 is seated in the bearing 57 and a hanger 122 provided with an orifice at its upper end portion engages the gib 121 at its central portion and extends downward through the slot 58. The hanger 122 is provided with an orifice at its lower end portion which engages a gib 123 at its central portion, the hanger passing between the furcations at the outer end of the spring 119, the spring at this end being seated upon the gib 123, the recesses at this end engaging the gib.

It will be understood that while only one-half of a spring rigging has been described in detail the other half is similar in all respects and a further description is not deemed necessary. The spring rigging thus described provides for the distribution of the load transmitted by the bolster to the wheel 30, the frame side members 1 and 2, and ultimately through the coiled springs 69 to the driven wheels 10 and 18. While the gibs 121 transmit part of this load to the frame side members these points of transmission may be, if desired, at various other suitable places on the wheel-frame assembly. While the bolster has been described in some detail it will be appreciated that it is given a suitable shape for strength and for best association with the other parts of the truck, but further description of such features is not considered essential. Furthermore while a preferred spring rigging has been described, it will be understood that certain features of the invention are not dependent upon any particular design of spring rigging.

The electric motor constructions 73 and 74 and their connections with the other parts of the truck are similar in all respects; therefore a description of the construction 73 will suffice. The construction 73 is flexibly connected at its inner end with the adjacent end of the cross member or bolster 72, more particularly the adjacent end wall of the body portion 75 of the bolster. The flexible connection, generally indicated by the reference numeral 124, is of a well-known design and no detailed description is therefore deemed necessary, reference being made to Patent No. 1,827,975, to G. F. Driemeyer where a similar connection is shown.

A gear wheel 125 (see Figs. 10–12) is secured on the axle 9 near the wheel 10 adjacent the frame side member 1. A gear wheel or pinion 126 is in driving engagement with the gear wheel 125 and is connected with the motor in the usual manner, to be driven thereby.

While it has been stated that the two motor constructions 73—74 and their connections are similar in all respects it will be noted that they are arranged in opposite directions and therefore various of the parts will be reversed, for instance the gear wheels 125 and 126 of one motor will be disposed at one side of the truck, while the corresponding gear wheels of the other motor will be disposed at the opposite side of the truck. There is however nothing claimed as new for the motor constructions or their connections or arrangements except the connecting of an axle driving motor with a bolster that is flexibly connected with the frame side members.

The outer end of the motor construction 73, or more properly the inclosing supporting casing 127, is provided with a partial bearing 128 which engages the axle 9 (see Figs. 10–12), embracing the portion of the axle at the right of the vertical central plane, thereby affording means for supporting this end of the motor construction upon the axle. A cap 129 embraces the axle to provide the remainder of the bearing and is detachably secured to the partial bearing 128 by means of bolts 130. The partial bearing 128 and likewise the cap 129 may extend throughout the width of the casing 127, or they may be made as two supporting bearings and caps respectively. They are only shown diagrammatically as they are well-known features, see for instance the beforementioned Driemeyer patent or the patent to Meyer, No. 1,920,997. It will therefore be understood that, when either of these terms are employed in the claims, it is intended to cover the partial bearing or the cap feature as the case may be, whether made in one or more parts; for instance where the removal of a cap is mentioned for the purpose of aiding in the removal of the axle, this will imply that the cap is removed if only one is employed, or that the caps are removed if more than one are employed. The gear wheel 125, in accordance with usual practice, is inclosed in a casing 131 (see patent to Kjolseth, No. 1,701,375) which is made in one or more detachable parts and, as is obvious, detachment must be made of sufficient parts of this casing, as well as the removal of the cap 129, before the axle 9 can be removed from the truck. And it will be understood that in the claims covering the removal of the axle feature, a preliminary step, where a separate casing for the gear wheel or wheels is employed, will be to remove the casing or a sufficient part thereof, no reference being made thereto in the claims, as it is a common practice when removing the axle; also in such claims the means for driving the axle 9 is considered as comprising two separable portions, one including the electric motor proper with its drive pinion 126, and the other including the gear wheel 125. These portions are capable of separation when the axle 9 and cross member or bolster 72 are relatively moved to increase the space therebetween in a direction longitudinally of the truck, the gear wheel 125 being associated or secured with the axle and the other portion, including the pinion 126, being associated or secured with the bolster, these movements being necessary for the removal of the axle, all of which is usual practice, the main novel feature being the connection of the axle driving means (motor construction) with a bolster flexibly connected to the frame side members (as previously stated) and the means providing relative movement between the frame side members and the bolster in a direction longitudinally of the truck.

While in describing the removal of an axle, reference will be made more particularly only to the frame side member 1 and its associated parts, it will be understood that a similar procedure is carried out simultaneously as regards both frame side members 1 and 2 without special mention of the frame side member 2 and its associated parts.

A driven wheeled axle, as for instance the axle 9, is removed in the following manner, which is best shown in the views Figs. 10, 11 and 12, which illustrate the six-wheel type of truck shown in Figs. 1 to 9:—The filler or shoe 99 furthermost from the axle 9 is first removed, the securing bolt 105 therefor being removed to permit the removal of the shoe. It should here be noted that two longitudinally opposed shoes are employed for the reason that two driven axles 9 and 17 are employed in the preferred exemplification of the invention, but where only one driven axle is employed, as for instance the driven axle 9, then only one shoe, the shoe at the right, Fig. 1, will be necessary. The opposite shoe 99 will be removed when the driven axle 17 is to be removed instead of the first mentioned shoe.

When the shoe at the right, Fig. 1, is removed, the desired relative movement between the frame side members and the bolster to increase the space between the bolster and the pedestal openings 3 in a direction longitudinally of the truck may be carried out, providing that either the cap 129 or shoe 16 be first removed, it being understood that the casing 131 will be removed or opened as above noted, if the cap be removed. In the present instance as the axle 17 is also a driven axle and accordingly connected with the bolster by the driving means, it will be necessary, in either instance, that the shoe 22 be likewise first removed. The frame side members and the bolster may then be given the beforementioned relative movement.

If the removed shoe 99 is made of sufficient thickness, the relative movement can be made sufficient to separate the gear wheels 125 and 126 from each other and to separate the partial bearing 128 from the axle to a sufficient extent to permit the axle with its wheels and gear wheel to be removed from the truck by vertical downward movement. The axle moves with the frame side members during said relative movement if the cap 129 be first removed and the casing 131 be removed or opened. But if the shoe 16 be first removed the axle will not move with the frame side members as it will be secured to the bolster through the driving means. After such relative movement of the frame side members, the cap 129 must then be removed and the casing 131 removed or sufficiently opened, whereupon the axle 9, being free, must be moved in its pedestal opening 3 to increase the space between the axle 9 and the bolster in a direction longitudinally of the frame, before the axle can be moved vertically downward for removal thereof, it being understood that in this particular type of truck the shoe 22 must first be removed in any instance.

If the shoe 99 at the right, Fig. 1, is not of sufficient thickness, the relative movement between the frame side members and the bolster will not be sufficient. In such event it will be necessary to remove the shoe 15 to provide additional space in the pedestal opening 3 for the movement of the axle therein, whereby a greater relative movement may be made between the axle and the bolster to enable the axle to be removed, that is to say, to enable the gear wheels 125 and 126 to be sufficiently separated and the partial bearing 128 to be separated from the axle 9. It will be understood that the shoes 15, 16 and 22 are removed by downward vertical movement, the closures 6 and 7 being first removed, all in the usual manner. The partial bearing 128 in usual practice extends, at the bottom, for some distance beyond the vertical center plane of the axle 9, thereby necessitating a greater relative movement between the axle and the bolster than would otherwise be necessary. In the preferred embodiment it is not considered expedient to make the shoe 99 of sufficient thickness to provide for all of the necessary relative movement between the axle and bolster. Therefore in this preferred embodiment the removal of the shoe 15 is relied upon to provide for the additional necessary movement between the axle and bolster.

When the frame side members and the bolster are given their relative movement, as above described, the hangers 116 and 122 (as viewed in Fig. 2) will swing toward the right. This will be all that will be required to permit the relative movement, if the truck is constructed to allow these hangers to have sufficient swinging movement to permit the frame side members and the bolster to be moved relatively to the desired extent.

In the preferred embodiment however it is deemed expedient, from a practical standpoint, to so proportion the various parts, that the required degree of swinging movement of the hangers will not be permissible. The bolster cannot move relative to the springs 119 in a direction longitudinally of the truck, due to the engagement of the band 120 with the groove 90. Therefore to permit of the desired relative movement between the frame side members and the bolster, the bolster, which merely rests upon the springs 119, is jacked up with the superstructure to free the bolster from the springs 119. The longitudinal movement between the frame side members and bolster may then be carried out without in any way depending upon or disturbing the spring rigging.

It will be understood that when a wheeled axle is to be removed the vehicle is conveyed to bring the axle over a pit, suitably constructed, in the usual manner, to permit of the lowering of the wheeled axle to remove it from the truck. During this removal operation the truck will be supported on the wheels of the other two axles, and even though the axle 17, during the removal of the axle 9, will move relative to the frame side members in a direction longitudinally of the truck, nevertheless it will always be in engagement with its rocker plate 70, enabling it to support its share of the weight of the truck. It should also be noted that, in trucks of the present type, the flange 28, to best serve as a thrust bearing, is of too large a cross dimension to permit the box 12 to be removed from its axle 9 while in the pedestal opening 3 by outward lateral movement. Obviously if such removal could be effected the removal of the wheeled axle would be a relatively simple matter.

Fig. 10 shows the truck parts in their normal positions except that the bolster has been raised to clear the springs 119.

Fig. 11 shows the parts after the shoe 99 at the right has been removed and likewise after the shoes 16 and 22 (and shoe 15) have been removed, and the maximum relative movement between the frame side members and bolster has been made, the bolster having been raised as in Fig. 10.

Fig. 12 shows the parts positioned as in Fig. 11 except the cap 129 has been removed, and the relative movement between the axle 9 and the bolster has been made to increase the distance therebetween, the axle 9 being shown in its extreme position to the left, it being understood that the casing 131 has also been opened or removed to the required extent. In this position of the axle 9 it is entirely free from the partial bearing 128 and the gear wheel 125 is entirely free from the gear wheel or pinion 126, whereby the wheeled axle, with its gear wheel 125, is free for the downward vertical removal movement.

The wheeled axle 17 is removed in a manner similar to that described as to the wheeled axle 9, and a further description is therefore not deemed necessary. It is not necessary to remove the shoe 21, but for convenience, this will be done when the shoe 22 is removed, and the shoe 21 is therefore shown removed in Figs. 11 and 12.

Figs. 13, 14 and 15 illustrate a four-wheel truck of the removable journal box type, and Figs. 16 and 17 illustrate a four-wheel truck of the fixed journal box type. The views in Figs. 13 to 17 are shown more or less diagrammatically, but illustrate certain features of the present invention applied to such trucks, including the axle removal feature. Many of the parts of these four-wheel trucks are similar to corresponding parts of the six-wheel truck, and they will be indicated by similar reference numerals with the letter a affixed thereto. In view of this similarity a detailed description is not deemed necessary.

The four-wheel trucks, like the six-wheel truck, have their wheels inside the frame side members. Both axles are shown motor driven although, like the six-wheel truck, only one axle need be motor driven if desired, in which instance the operation of the removal of the driven axle would not in any way depend upon any adjustment of the other axle. It will be understood that a non-driven axle is removed simply by dropping it vertically downward from the engaging pedestals. However as both axles of the four-wheel trucks are shown as driven axles, the procedure for removal of either of them will be similar in the main to that for the removal of a driven axle of the six-wheel truck, except that as there is no third axle, the frame side members, at their ends where the axle is to be removed, should preferably be supported by blocks or otherwise.

For convenience only one side of each four-wheel truck is shown, namely the side similar to that of the six-wheel truck shown in Fig. 2, and as both sides are similar a description of the side shown will suffice.

The frame side member 1a is hollow and has housed therein a leaf spring 132 upon which the bolster 72a is supported. The spring is hung at its ends from the frame side member by hangers 133 and ample room is provided so that these hangers may swing, as clearly shown in Figs. 14, 15 and 17, to facilitate the removal of a wheeled axle without necessitating raising the bolster from its supporting springs as has been described in connection with the six-wheel truck. Otherwise the procedure for the removal of a wheeled axle is substantially the same as in the six-wheel truck.

The fixed journal boxes 134 of Figs. 16 and 17 may of course be employed in a six-wheel truck if desired.

As only outer fillers or shoes are necessary to provide the required space for the removal of an axle, the truck of Figs. 16 and 17 is therefore provided with only an outer shoe 135 for each box. The shoe is conveniently formed integral with a bottom closing plate 136 which is held within the box 134 by a bolt engaged in aligned orifices formed in the plate and the lower ends of the adjacent portions of the box (not shown).

A cellar 137 is supported on the plate 136, and the usual bearing members 138 are disposed between the top wall of the journal box and the axle for transmitting the load from the frame side member to the axle. As the axle to be removed (as for instance the axle 9a) is close to the inner wall of its journal box, it is necessary to first remove the cap from the partial bearing 128a which is associated with the axle 9a. The axle may then move with the frame side member, after which the shoe 135, with the closing plate 136 and the cellar 137, are removed, or these parts may be removed simultaneously with the removal of the cap. The relative movement between the axle and bolster may then take place to increase the space between the bolster and axle. It should be stated however that where both axles are motor driven the shoe 135 associated with the axle not being removed (axle 17a) must be removed before the relative movement between the frame side members and the bolster can take place.

Fig. 16 shows the parts in normal position, and while only the righthand portion of the box assemblage is shown, it will be understood that the left hand assemblage is similar but reversed.

Fig. 17 shows the truck with the axle 9a ready to be removed by downward vertical movement.

It will be understood that various of the parts shown are not shown in complete detail but only diagrammatically outlined and various parts are eliminated, only sufficient structure being shown to render a clear understanding of the invention.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A six-wheel truck comprising a bolster supporting means having frame side members provided with openings in the end portions thereof and an opening intermediate said end portions, and a journal box in each of said openings constituting six journal boxes aligned transversely of said truck in pairs; wheeled axles disposed one in each said pair of journal boxes for supporting said bolster supporting means; a bolster; and a spring rigging at each side of said truck comprising a member, extending longitudinally of said truck, supported between its ends by the journal box in the intermediate opening adjacent thereto, and means at each end of said member for connecting said ends with said bolster supporting means, said connecting means being in connection, at one of its ends, with the end of said member adjacent thereto, and at its opposite end, with said bolster supporting means, and at its intermediate portion with said bolster, whereby said bolster is supported by said bolster supporting means, at least one of said connecting means comprising a leaf spring extending longitudinally of said truck providing, at a portion between its ends, said connection with said bolster, means connecting the outer end of said spring with said bolster supporting means for support thereby, providing said connection with said bolster supporting means, and means connecting the opposite end of said spring with the adjacent end of said member for support thereby, providing said connection with said member end, said last mentioned means comprising a lever pivotally connected at one of its ends to the adjacent side member, means connecting the opposite end of said lever with said adjacent member end, and means connecting the inner end of said spring with an intermediate portion of said lever.

2. A six-wheel truck comprising an assemblage having frame side members, wheeled axles journalled in the end portions of said side members, each of said side members being provided with an opening between said axles, a journal box in each of said openings, and a wheeled axle in said journal boxes; a bolster; and a spring rigging at each side of said truck comprising a member, extending longitudinally of said truck, supported between its ends by one of said boxes adjacent thereto, and means at each end of said member in connection, at one of its ends, with the end of said member adjacent thereto, and at its opposite end, with said assemblage, and at its intermediate portion with said bolster, whereby said bolster is supported by said assemblage, at least one of said means comprising a leaf spring extending longitudinally of said truck providing, at a portion between its ends, said connection with said bolster, means connecting the outer end of said spring with the adjacent side member for support thereby, providing said connection with said assemblage, and means connecting the opposite end of said spring with the adjacent end of said member for support thereby, providing said connection with said member end, said last mentioned means comprising a lever pivotally connected at one of its ends to the adjacent side member, means connecting the opposite end of said lever with said adjacent member end, and means connecting the inner end of said spring with an intermediate portion of said lever.

3. In a railway vehicle structure, oppositely disposed frame side members; a driving motor disposed between said side members; a bolster secured to said motor; motor driven means including a wheeled axle having end portions disposed in openings in said side members removable therefrom by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; and removable means engaging said side members and said bolster normally preventing movement of said side members relative to said bolster longitudinally of said structure in a direction to effect movement of said openings away from said bolster, and when removed permitting said longitudinal movement of said side members, said openings being thereby moved in a direction away from said bolster to permit at least a part of said initial movement of said driven means away from said motor to be effected.

4. In a railway vehicle structure, oppositely disposed frame side members; a driving motor disposed between said side members; a bolster secured to said motor; swingable means connecting said side members and said bolster together and supporting the latter adapted for swinging movement upon movement of said side members relative to said bolster longitudinally of said structure; motor driven means including a wheeled axle having end portions disposed in openings in said side members removable therefrom by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; and removable means engaging said side members and said bolster normally preventing movement of said side members relative to said bolster longitudinally of said structure and swinging of said swingable means, in a direction to effect movement of said openings away from said bolster, and when removed permitting said longitudinal movement of said side members and said swinging of said swingable means, said openings being thereby moved in a direction away from said bolster to permit at least a part of said initial movement of said driven means away from said motor to be effected.

5. In a railway vehicle structure, oppositely disposed frame side members; a driving motor disposed between said side members; a bolster secured to said motor; means engaging said bolster and said side members for connection of said bolster with said side members whereby said bolster is supported by said side members and said connection is broken by vertical relative movement between said bolster and said side members; motor driven means including a wheeled axle having end portions disposed in openings in said side members removable therefrom by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; and removable means engaging said side members and said bolster normally preventing movement of said side members relative to said bolster longitudinally of said structure in a direction to effect movement of said openings away from said bolster, and when removed, adapting said side members, upon the breaking of said connection, to be moved relative to said bolster longitudinally of said structure, said openings being thereby moved in a direction away from said bolster to permit at least a part of said initial movement of said driven means away from said motor to be effected.

6. In a railway vehicle structure, oppositely disposed frame side members; a driving motor disposed between said side members; a bolster secured to said motor and associated with said side members; motor driven means including a wheeled axle having end portions disposed in openings in said side members removable therefrom by downward movement relative to said side members, said motor being provided with a driving gear and said driven means being provided with a driven gear secured to said axle and engaging said driving gear, and said motor having a partial bearing supportedly engaged by said axle, said driven means and said motor being thereby normally in interlocking operable engagement necessitating initial movement of said driven means longitudinally of said structure away from said motor to sever said interlocking engagement to permit said movement of said end portions downward relative to said side members; a removable cap securing said partial bearing to said axle; and removable means engaging said side members and said bolster normally preventing movement of said side members relative to said bolster longitudinally of said structure in a direction to effect movement of said openings away from said bolster, and when removed permitting said longitudinal movement of said side members when said cap is removed, said openings being thereby moved in a direction away from said bolster to permit at least a part of said initial movement of said driven means away from said motor to be effected.

7. In a railway vehicle structure, oppositely disposed frame side members; a driving motor disposed between said side members; motor supporting means secured to said motor and associated with said side members; motor driven means including a wheeled axle having end portions disposed in openings in said side members removable therefrom by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; removable means engaging said side members and said motor supporting means normally preventing movement of said side members relative to said motor supporting means longitudinally of said structure in a direction to effect movement of said openings away from said motor supporting means, and when removed permitting said longitudinal movement of said side members, said openings being thereby moved in a direction away from said motor supporting means to permit at least a part of said initial movement of said driven means away from said motor to be effected; a second wheeled axle disposed at the opposite side of said motor supporting means from said driven axle, said side members having openings engaging said second axle; means connecting said second axle with said motor supporting means in spaced relation therewith in a direction longitudinally of said structure, said second axle being spaced from the wall of each of its said engaged openings, remote from said motor supporting means; and a removable filler between said second axle and each of said last mentioned walls normally preventing, and when removed permitting, said relative movement between said side members and said motor supporting means.

8. In a railway vehicle structure, oppositely disposed frame side members; a driving motor disposed between said side members; motor supporting means secured to said motor and associated with said side members; motor driven means including a wheeled axle having end portions disposed in openings in said side members and spaced from the walls thereof remote from said motor supporting means and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; removable means engaging said side members and said motor supporting means normally preventing movement of said side members relative to said motor supporting means longitudinally of said structure in a direction to effect movement of said openings away from said motor supporting means, and when removed permitting said longitudinal movement of said side members, said openings being thereby moved in a direction away from said motor supporting means to permit a part of said initial movement of said driven means away from said motor to be effected; and a removable filler in the space between each said end portion and said wall spaced therefrom permitting, when removed, movement of said axle toward said spaced walls effecting thereby another part of said initial movement of said driven means away from said motor.

9. In a railway vehicle structure, oppositely disposed frame side members; a driving motor disposed between said side members; a bolster secured to said motor; swingable means connecting said side members and said bolster together and supporting the latter adapted for swinging movement upon movement of said side members relative to said bolster longitudinally of said structure; motor driven means including a wheeled axle having end portions disposed in openings in said side members and spaced from the walls thereof remote from said bolster and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; removable means engaging said side members and said bolster normally preventing movement of said side members relative to said bolster longitudinally of said structure and swinging of said swingable means, in a direction to effect movement of said openings away from said bolster, and when removed permitting said longitudinal movement of said side members and said swinging of said swingable means, said openings being thereby moved in a direction away from said bolster to permit a part of said initial movement of said driven means away from said motor to be effected; and a removable filler in the space between each said end portion and said wall spaced therefrom permitting, when removed, movement of said axle toward said spaced walls effecting thereby another part of said initial movement of said driven means away from said motor.

10. In a railway vehicle structure, oppositely disposed frame side members; a driving motor disposed between said side members; a bolster secured to said motor; means engaging said bolster and said side members for connection of said bolster with said side members whereby said bolster is supported by said side members and said connection is broken by vertical relative movement between said bolster and said side members; motor driven means including a wheeled axle having end portions disposed in openings in said side members and spaced from the walls thereof remote from said bolster and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; removable means engaging said side members and said bolster normally preventing movement of said side members relative to said bolster longitudinally of said structure in a direction to effect movement of said openings away from said bolster, and when removed, adapting said side members, upon the breaking of said connection, to be moved relative to said bolster longitudinally of said structure, said openings being thereby moved in a direction away from said bolster to permit a part of said initial movement of said driven means away from said motor to be effected; and a removable filler in the space between each said end portion and said wall spaced therefrom permitting, when removed, movement of said axle toward said spaced walls effecting thereby another part of said initial movement of said driven means away from said motor.

11. In a railway vehicle structure, oppositely disposed frame side members; a driving motor disposed between said side members; a bolster secured to said motor and associated with said side members; motor driven means including a wheeled axle having end portions disposed in openings in said side members and spaced from the walls thereof remote from said bolster and removable from said openings by downward movement relative to said side members, said motor being provided with a driving gear and said driven means being provided with a driven gear secured to said axle and engaging said driving gear, and said motor having a partial bearing supportedly engaged by said axle, said driven means and said motor being thereby normally in interlocking operable engagement necessitating initial movement of said driven means longitudinally of said structure away from said motor to sever said interlocking engagement to permit said movement of said end portions downward relative to said side members; a removable cap securing said partial bearing to said axle; removable means engaging said side members and said bolster normally preventing movement of said side members relative to said bolster longitudinally of said structure in a direction to effect movement of said openings away from said bolster, and when removed permitting said longitudinal movement of said side members, said openings being thereby moved in a direction away from said bolster to permit a part of said initial movement of said driven means away from said motor to be effected when said cap is removed; and a removable filler in the space between each said end portion and said wall spaced therefrom permitting, when removed, movement of said axle toward said spaced walls effecting thereby another part of said initial movement of said driven means away from said motor.

12. In a railway vehicle structure, oppositely disposed frame side members; a driving motor disposed between said side members; motor supporting means secured to said motor and associated with said side members; motor driven means including a wheeled axle having end portions disposed in openings in said side members and spaced from the walls thereof remote from said motor supporting means and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; removable means engaging said side members and said motor supporting means normally preventing movement of said side members relative to said motor supporting means longitudinally of said structure in a direction to effect movement of said openings away from said motor supporting means, and when removed permitting said longitudinal movement of said side members, said openings being thereby moved in a direction away from said motor supporting means to permit a part of said initial movement of said driven means away from said motor to be effected; a second wheeled axle disposed at the opposite side of said motor supporting means from said driven axle, said side members having openings engaging said second axle; means connecting said second axle with said supporting means in spaced relation therewith in a direction longitudinally of said structure, said second axle being spaced from the wall of each of its said engaged openings, remote from said motor supporting means; a removable filler between said second axle and each of said last mentioned walls normally preventing, and when removed permitting, said relative movement between said side members and said motor supporting means; and a removable filler in the space between each said end portion and said wall spaced therefrom permitting, when removed, movement of said first mentioned axle toward its said spaced walls effecting thereby another part of said initial movement of said driven means away from said motor.

13. A truck comprising three wheeled axles; frame side members, each having a raised portion disposed above the intermediate axle; a bolster having a body portion between said side members above the intermediate axle and a pair of arms extending from each side of said body portion, the arms of each said pair extending diagonally in a direction toward the adjacent side member and the adjacent end axle to provide a space between the arms of each pair into which the adjacent raised portion extends, each said arm overriding said adjacent side member and having an end portion extending therebeyond; means connecting each said side member with said arms adjacent thereto, each said arm being in engagement with its respective said connecting means and its said respective connecting means including a spring whereby said bolster is resiliently connected at its four said arms to said side members; and means, extending outwardly from said side member, adjacent each of said end portions and associated therewith, confining the permissible movement of said bolster, relative to said side member, to vertical movement only.

14. A truck comprising three wheeled axles; frame side members, each having a raised portion disposed above the intermediate axle; a bolster having a body portion between said side members above the intermediate axle, a pair of arms extending from each side of said body portion, the arms of each said pair extending diagonally in a direction toward the adjacent side member and the adjacent end axle to provide a space between the arms of each pair into which the adjacent raised portion extends, each said arm overriding said adjacent side member and having an end portion extending therebeyond, and a beam connecting the arms of each pair at their said end portions, each of said beams being provided with means for securing an auxiliary thereto; means connecting each said side member with said arms adjacent thereto, each said arm being in engagement with its respective said connecting means and its said respective connecting means including a spring whereby said bolster is resiliently connected at its four said arms to said side members; and means, extending outwardly from said side member, adjacent each of said end portions and associated therewith, confining the permissible movement of said bolster, relative to said side member, to vertical movement only.

15. In a railway vehicle structure, oppositely disposed frame side members; a driving motor disposed between said side members; a bolster secured to said motor and associated with said side members; motor driven means including a wheeled axle having end portions disposed in openings in said side members removable therefrom by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members, and said motor having a partial bearing supportedly engaged by said axle; a removable cap securing said partial bearing to said axle; a second wheeled axle disposed at the opposite side of said bolster from said driven axle, said side members having openings engaging said second axle; means connecting said second axle with said bolster in spaced relation therewith in a direction longitudinally of said structure, said second axle being spaced from the wall of each of its said engaged openings, remote from said bolster; a removable filler between said second axle and each of said last mentioned walls; and removable means engaging said side members and said bolster, said removable means and said removable fillers normally preventing movement of said side members relative to said bolster longitudinally of said structure in a direction to effect movement of said first mentioned openings away from said bolster, and when removed permitting said longitudinal movement of said side members relative to said bolster when said cap is removed, said first mentioned openings being thereby moved in a direction away from said bolster to permit at least a part of said initial movement of said driven means away from said motor to be effected.

16. In a railway vehicle structure, oppositely disposed frame side members; a driving motor disposed between said side members; a bolster secured to said motor and associated with said side members; motor driven means including a wheeled axle having end portions disposed in openings in said side members and spaced from the walls thereof adjacent said bolster and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; a removable filler in the space between each said end portion and said wall spaced therefrom; a second wheeled axle disposed at the opposite side of said bolster from said driven axle, said side members having openings engaging said second axle; means connecting said second axle with said bolster in spaced relation therewith in a direction longitudinally of said structure, said second axle being spaced from the wall of each of its said engaged openings, remote from said bolster; a removable filler between said second axle and each of said last mentioned walls; and removable means engaging said side members and said bolster, said removable means and said removable fillers for said driven axle and said second axle normally preventing movement of said side members relative to said bolster longitudinally of said structure in a direction to effect movement of said first mentioned openings away from said bolster, and when removed permitting said longitudinal movement of said side members relative to said bolster, said first mentioned openings being thereby moved in a direction away from said bolster to permit at least a part of said initial movement of said driven means away from said motor to be effected.

17. In a railway vehicle structure, oppositely disposed frame side members; a driving motor disposed between said side members; a bolster secured to said motor and associated with said side members; motor driven means including a wheeled axle having end portions disposed in openings in said side members and spaced from the walls thereof adjacent said bolster and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members, and said motor having a partial bearing supportedly engaged by said axle; a removable cap securing said partial bearing to said axle; a removable filler in the space between each said end portion and said wall spaced therefrom; a second wheeled axle disposed at the opposite side of said bolster from said driven axle, said side members having openings engaging said second axle; means connecting said second axle with said bolster in spaced relation therewith in a direction longitudinally of said structure, said second axle being spaced from the wall of each of its said engaged openings, remote from said bolster; a removable filler between said second axle and each of said last mentioned walls; and removable means engaging said side members and said bolster, said removable means and said removable fillers for said driven axle and said second axle normally preventing movement of said side members relative to said bolster longitudinally of said structure in a direction to effect movement of said first mentioned openings away from said bolster and when removed permitting said longitudinal movement of said side members relative to said bolster, the removal of said cap permitting longitudinal movement of said driven axle relative to said moved side members in a direction away from said bolster, to thereby effect at least a part of said initial movement of said driven means away from said motor.

18. In a railway vehicle structure, oppositely disposed frame side members; a driving motor disposed between said side members; a bolster secured to said motor and associated with said side members; motor driven means including a wheeled axle having end portions disposed in openings in said side members and spaced from the walls thereof adjacent said bolster and removable from said openings by downward movement relative to said side members, said driven means and said motor being normally in interlocking operable engagement necessitating initial movement of said driven means longitudinally of said structure away from said motor to sever said interlocking engagement to permit said movement of said end portions downward relative to said side members; a removable filler in the space between each said end portion and said wall spaced therefrom; and removable means engaging said side members and said bolster, said removable means and said removable fillers normally preventing movement of said side members relative to said bolster longitudinally of said structure in a direction to effect movement of said openings away from said bolster, and when removed permitting said longitudinal movement of said side members relative to said bolster, said openings being thereby moved in a direction away from said bolster to permit at least a part of said initial movement of said driven means away from said motor to be effected.

JAMES G. BLUNT.